Figure 1:
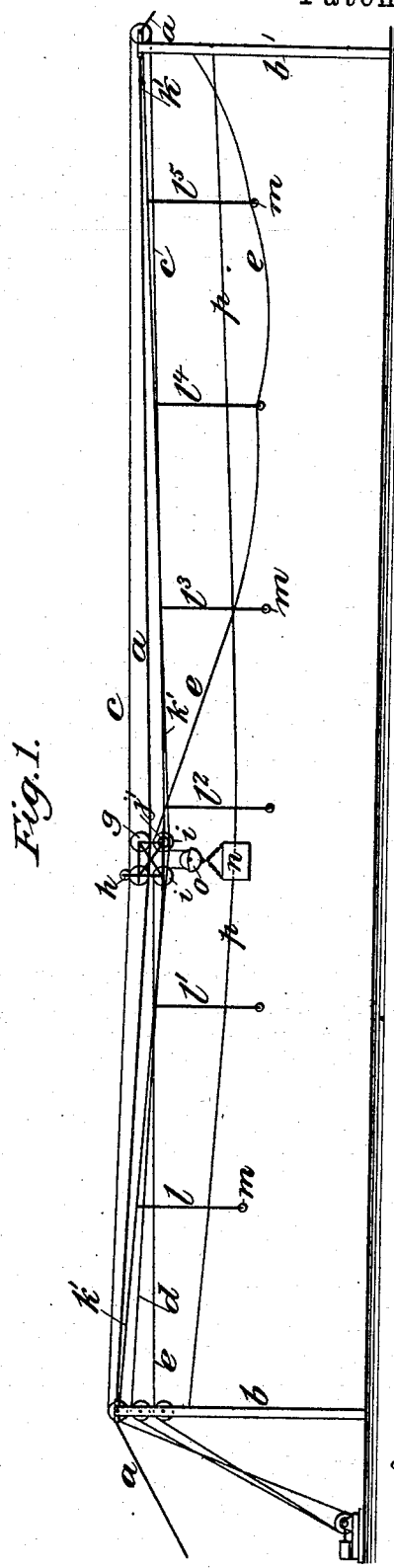

(No Model.)

T. S. MILLER.
CONVEYING APPARATUS.

No. 503,800. Patented Aug. 22, 1893.

3 Sheets—Sheet 1.

Witnesses:—

Inventor:
Thomas Spencer Miller
By Gifford & Law
his Attorneys

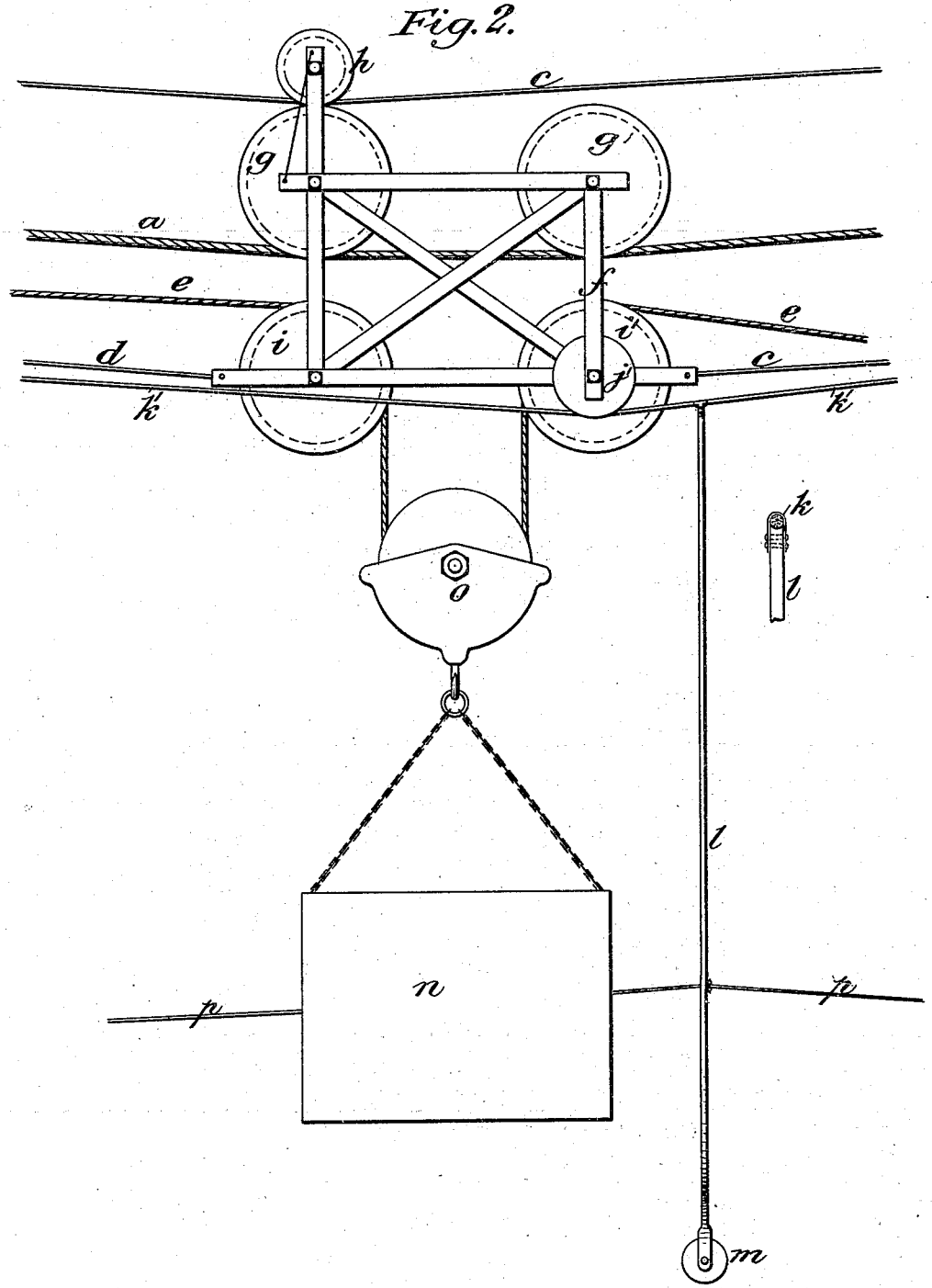

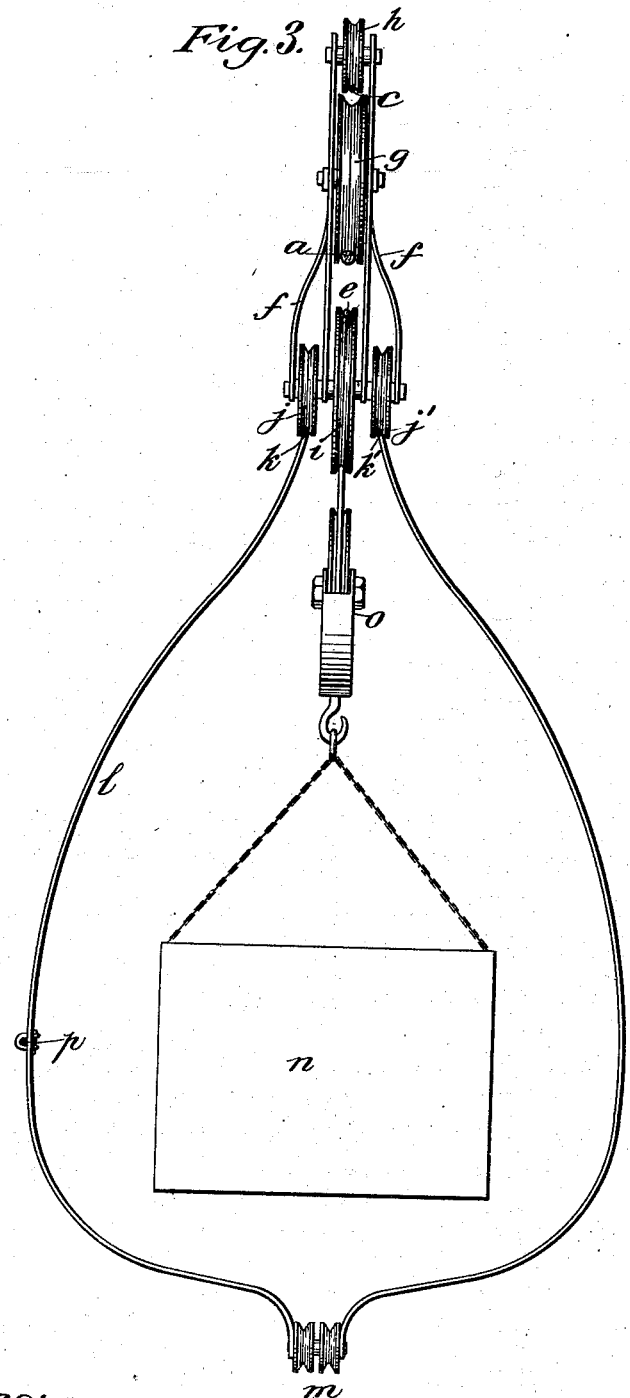

UNITED STATES PATENT OFFICE.

THOMAS SPENCER MILLER, OF SOUTH ORANGE, NEW JERSEY.

CONVEYING APPARATUS.

SPECIFICATION forming part of Letters Patent No. 503,800, dated August 22, 1893.

Application filed April 29, 1893. Serial No. 472,319. (No model.)

*To all whom it may concern:*

Be it known that I, THOMAS SPENCER MILLER, of South Orange, in the State of New Jersey, have invented a new and useful Improvement in Conveying Apparatus, of which the following is a specification.

Figure 1 is a side view of my apparatus. Fig. 2 is a larger side view of the load carriage and one of the fall rope carriers. Fig. 3 is an end view of the same.

$a$ is a cable or trackway. $b$ is the head support for the same.

$b'$ is the tail support.

$c$ is an outhaul rope.

$d$ is an inhaul rope.

$e$ is a fall rope.

$f$ is the load carriage bearing the wheels $g$ and $g'$ to run on the cable or trackway, the wheel $h$ to steady the outhaul rope and the sheaves $i$ and $i'$ for the fall rope.

$j$ and $j'$ are two wheels which perform the function of guides, mounted one upon each side of the carriage so that the fall rope and fall rope sheave are between them.

$k$ and $k'$ are two parallel ropes stretched between the head and tail supports of the cable, one of which is held beneath each of the wheels $j$ and $j'$ that are grooved for that purpose. Thus, at the point where they are engaged with the wheels on the carriage, the ropes $k$ and $k'$ are held relatively to the cable $a$ so that the cable is at the apex and the ropes at the ends of the base of substantially an isosceles triangle.

$l, l', l^2, l^3, l^4, l^5$ is a series of loops constructed of such material, as metal, as to retain their form and suspended at stated intervals from the ropes $k$ and $k'$, as shown in Fig. 3. At the bottom of each of these loops are sheaves $m$ adapted to receive and support the fall rope. Each loop is so large as to admit of the passage through it after being hoisted up of the load $n$ and the fall block $o$. By the construction described, at the instant that the carriage with its fall block and load is passing either of the loops $l$, the wheels $j$ and $j'$ will serve to fix the position of the ropes $k$ and $k'$ so rigidly with respect to the other parts that the loop will be held properly centered around the parts that are to pass through it and there will be no collision. After the carriage has passed, the loop will be in position to receive and support the slack of the fall rope.

$p$ is a steadying rope stretched between the head and tail cable supports and which is secured to each of the loops so as to prevent the swaying of the loops in a direction lengthwise of the cable.

I claim—

1. In a conveying apparatus in combination, the head and tail cable supports, a cable extended between them, a loop depending from said cable, a load carriage and a fall rope; said loop being adapted to permit the passage of the load and fall and adapted to support the slack of the fall rope, substantially as described.

2. In a conveying apparatus in combination, a cable or trackway, a carriage, a fall rope, a guide connected with the carriage on each side of the fall rope, two ropes engaging with said guides and stretched between the cable supports and a series of loops suspended from said ropes and adapted to admit of the passage of the load and fall and support the slack of the fall rope, substantially as described.

3. In a hoisting and conveying apparatus, a load carriage, a fall rope whereby the load is suspended from said carriage, a cable or trackway whereby said carriage is supported, two auxiliary ropes parallel or nearly so with the cable or trackway, a fall rope carrier engaging with both of said auxiliary ropes whereby it is supported independently of said cable and means upon the load carriage whereby both of said auxiliary ropes are depressed as the cable is depressed under the load, substantially as described.

THOS. SPENCER MILLER.

Witnesses:
FRED S. KEMPER,
J. E. GREER.